(12) United States Patent
Ichikawa

(10) Patent No.: US 8,693,041 B2
(45) Date of Patent: Apr. 8, 2014

(54) PRINTING APPARATUS

(75) Inventor: Kazuki Ichikawa, Gamagori (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 97 days.

(21) Appl. No.: 13/524,410

(22) Filed: Jun. 15, 2012

(65) Prior Publication Data

US 2013/0021646 A1 Jan. 24, 2013

(30) Foreign Application Priority Data

Jul. 22, 2011 (JP) .................. 2011-160598

(51) Int. Cl.
*G06F 3/12* (2006.01)

(52) U.S. Cl.
USPC ........................................ 358/1.15

(58) Field of Classification Search
USPC ......... 358/1.15, 1.16, 1.17, 403, 426.05, 404; 399/83; 711/100, 170, 171, 172
See application file for complete search history.

(56) References Cited

U.S. PATENT DOCUMENTS

| 6,932,523 | B1 * | 8/2005 | Yamada et al. | .................. 400/78 |
| 2006/0187481 | A1 | 8/2006 | Hayakawa | |
| 2009/0021780 | A1 * | 1/2009 | Sato et al. | .................. 358/1.15 |
| 2012/0107030 | A1 | 5/2012 | Goto | |

FOREIGN PATENT DOCUMENTS

| JP | 6-152889 | 5/1994 |
| JP | H11-42817 | 2/1999 |
| JP | 2001-63158 | 3/2001 |
| JP | 2002-178569 | 6/2002 |
| JP | 2006-231673 | 9/2006 |
| JP | 2012-96453 | 5/2012 |

* cited by examiner

*Primary Examiner* — Jacky X Zheng

(74) *Attorney, Agent, or Firm* — Scully, Scott, Murphy & Presser, PC

(57) ABSTRACT

A printing apparatus includes: a receiving section which receives a printing job having a term of validity and printing data from an external device; a storage section in which the printing job received by the receiving section is stored; an input section which accepts a printing instruction to perform printing based on the printing job stored in the storage section; a printing section which performs the printing based on the printing job stored in the storage section in a case that the input section accepts the printing instruction; and a processing section which is configured to include: an obtaining section configured to obtain an information of free-space capacity of the storage section under a condition that the receiving section receives the printing job; and a determining section configured to determine a predetermined storage capacity for the printing job based on the term of validity of the printing job.

8 Claims, 7 Drawing Sheets

PRINTING APPARATUS

CROSS REFERENCE TO RELATED APPLICATION

The present application claims priority from Japanese Patent Application No. 2011-160598, filed on Jul. 22, 2011, the disclosure of which is incorporated herein by reference in its entirety.

BACKGROUND OF THE INVENTION

1. Field of the Invention

The present invention relates to a printing apparatus which stores a printing job in a storage section of the printing apparatus and performs printing of the printing job when a printing instruction by a user is accepted.

2. Description of the Related Art

Conventionally, there is a printing apparatus in which a printing job transmitted from a PC can be stored in a storage section such as a RAM (see Japanese Patent Application laid-open No. H11-42817). The printing apparatus executes the printing job in a case that a printing instruction of the printing job is accepted before an expiration date of printing (print expiration date) of the printing job stored in the storage section elapses. On the other hand, the printing apparatus deletes the printing job from the storage section when the print expiration date elapses.

However, in a case that many printing jobs, each of which has a long period of time until the print expiration date elapses, are stored in the storage section, the following problem arises. That is, there is fear that the storage section is occupied for the long period of time by such printing jobs.

In view of the above, an object of the present teaching is to provide a printing apparatus which is capable of preventing a printing job, which has a long period of time until a print expiration date elapses, from occupying a storage section for the long period of time.

SUMMARY OF THE INVENTION

According to an aspect of the present teaching, there is provided a printing apparatus which is configured to communicate with an external device and perform printing, the apparatus including: a receiving section which is configured to receive a printing job having a term of validity and printing data from the external device; a storage section which is configured to store the printing job received by the receiving section; an input section which is configured to accept a printing instruction to perform the printing based on the printing job stored in the storage section; a printing section which is configured to perform the printing based on the printing job stored in the storage section in a case that the input section accepts the printing instruction; and a processing section which is configured to include; an obtaining section which is configured to obtain an information of free-space capacity of the storage section under a condition that the receiving section receives the printing job; and a determining section which is configured to determine a predetermined storage capacity for the printing job based on the term of validity of the printing job, wherein the processing section is configured to store the printing job in the storage section, in a case that the receiving section receives the printing job and that the free-space capacity of the storage section obtained by the obtaining section is larger than the predetermined storage capacity determined by the determining section, and the processing section is configured not to store the printing job in the storage section, in a case that the receiving section receives the printing job and that the free-space capacity of the storage section obtained by the obtaining section is not larger than the predetermined storage capacity determined by the determining section. Further, in a case that the receiving section receives a first printing job having a first term of validity and a second printing job having a second term of validity which is longer than the first term of validity, the determining section is configured to determine the predetermined storage capacity for the second printing job to be larger than the predetermined storage capacity for the first printing job.

In the printing apparatus according to the present teaching, the predetermined storage capacity is determined so that the longer the period of time after the receiving section receives the printing job and before the print expiration date of the printing job elapses (term of validity) is, the larger the predetermined storage capacity is. In the case that the free-space capacity obtained by the obtaining section is not more than the predetermined storage capacity determined by the determining section, the printing job is not stored in the storage section. As a result, the printing job having the long period of time until the print expiration date elapses is less likely to be stored in the storage section as compared with the printing job having the short period of time until the print expiration date elapses. Accordingly, it is possible to prevent the printing job, which has the long period of time until the print expiration date elapses, from occupying the storage section for the long period of time.

DESCRIPTION OF THE PREFERRED EMBODIMENTS

First Embodiment

An explanation will be made in detail with reference to the accompanying drawings about the first embodiment in which a printing apparatus according to the present teaching is embodied. In this embodiment, the present teaching is applied to a printer which is configured to communicate with a personal computer (PC) and a server.

<Structure of Printer>

Figure 1:
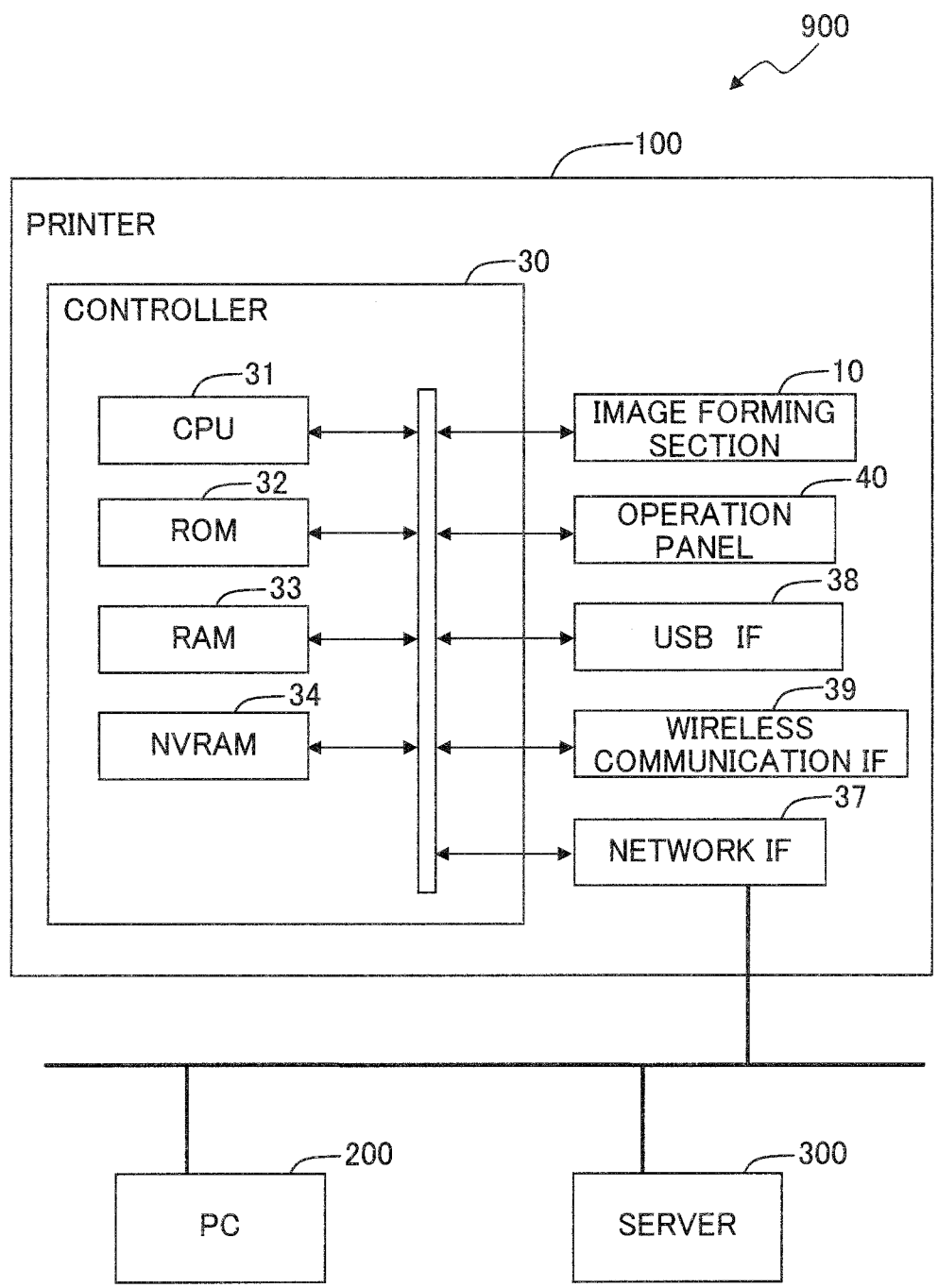
FIG. 1 is a block diagram showing an electrical structure of a printer according to the first embodiment.

As shown in FIG. 1, a printer 100 (an example of a printing apparatus) according to this embodiment includes a controller 30 provided with a CPU 31, a ROM 32, a RAM 33, and a NVRAM (non-volatile RAM) 34. Further, the controller 30 is electrically connected to an image forming section 10 which prints an image on a paper sheet, an operation panel 40 on which an operation state is displayed and through which an input operation by a user is accepted, a network interface 37, a USB interface 38, and a wireless communication interface 39.

In the ROM 32, firmware which is a control program for controlling the printer 100, various settings, initial values, etc., are stored. The RAM 33 and the NVRAM 34 are utilized as a work area at which the various control programs are read or as a storage area in which image data is temporarily stored.

The CPU 31 (an example of an obtaining section, a determining section, and a processing section) controls each component of the printer 100, while storing, in the RAM 33 or the NVRAM 34, various processing results processed in accordance with the control program read from the ROM 32 and a signal from each of sensors.

The network interface 37, the USB interface 38, and the wireless communication interface 39 (examples of a receiving section) are interfaces which make it possible to communicate the printer 100 with any other devices. The printer 100 receives the printing job transmitted from any other devices via these interfaces. In this embodiment, the printer 100 is configured to communicate with external devices such as a personal computer (PC) 200, a server 300, and the like, via the network interface 37. In addition to that, the printer 100 may communicate with any other external devices via the USB interface 38 or the wireless communication interface 39.

The image forming section 10 (an example of a printing section of the present teaching) may be any, provided that the image can be printed on the paper sheet. The image forming system of the image forming section 10 may be either the electro photography system or the ink-jet system. Further, the image forming section 10 may form either a color image or a monochrome (black and white) only.

The operation panel 40 (an example of an input section) includes various buttons through which the input operation by the user is accepted and a display section (for example, a liquid crystal display) on which character information is displayed. The various buttons include, for example, a button through which the user carries out an instruction to perform the printing operation and a cancel button through which the user carries out an instruction to cancel the printing operation.

<Structure and Operation of Printing System>

At first, an explanation will be made about the structure of a printing system 900 which includes the printer 100. As shown in FIG. 1, the printing system 900 of this embodiment is configured so that the printer 100, the PC 200, and the server 300 are connected to one another via a network. In FIG. 1, only the printer 100, the PC 200, and the server 300 are connected to the network in order to simplify the explanation. However, the structure of the printing system 900 is not limited thereto. For example, any other information process apparatus, such as a mobile phone may be connected to the printing system 900. Alternatively, the following structure is allowable. That is, a plurality of PCs 200 are connected to the network and each of the PCs 200 transmits the printing job to the same printer 100.

Figure 2:
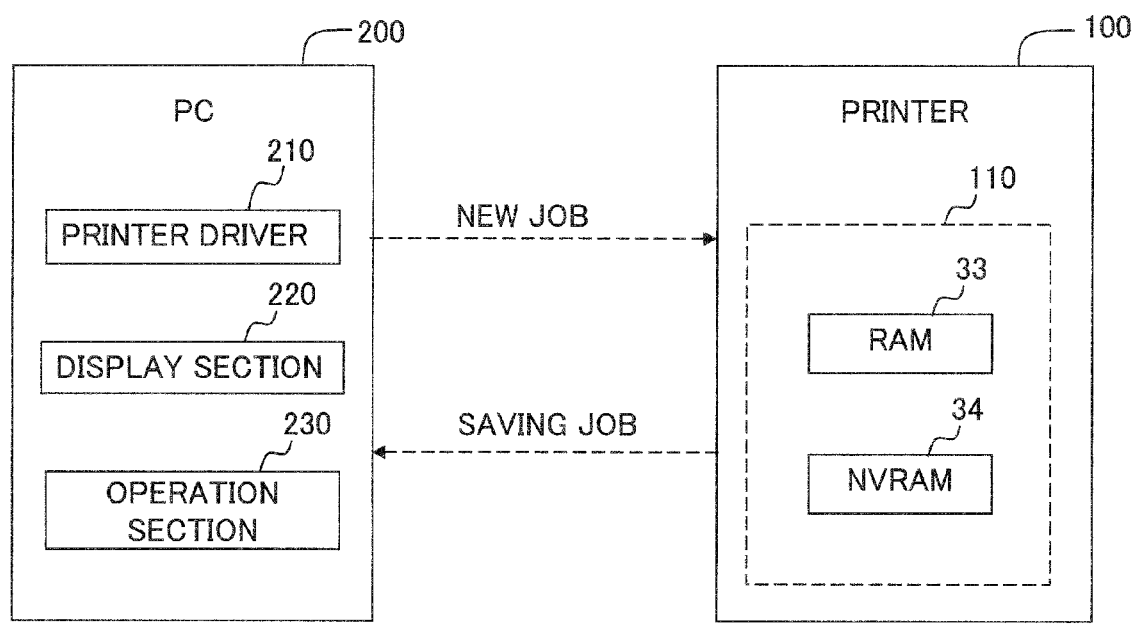
FIG. 2 is a block diagram schematically showing a construction of a printing system including the printer.

Next, an explanation will be made with reference to FIG. 2 about the operation of the printing system 900. In the printing system 900, when the PC 200 accepts a printing job transmission instruction from the user via an operation section 230 of the PC 200, a printer driver 210 creates a printing job. Then, the printing job is transmitted to the printer 100 from the PC 200. The printing job includes, in addition to the printing data as the print objective, information to identify the printing job, an amount of data (data amount) of the printing job, information to identify the user who transmits the printing job, and an expiration date (term of validity) of printing of the printing job. The print expiration date may be set by the input operation of the user or may be set by the printer driver 210 automatically.

When the printer 100 receives the printing job, the printing job is stored in a memory area 110 (an example of a storage section of the present teaching) provided to reserve the printing job. In this embodiment, the printer 100 is configured as follows. That is, in a case that reception of a new printing job (hereinafter referred to as a new job) is started, the printer 100 successively writes the new job, which is being received by the printer 100, in the memory area 110. The memory area 110 is configured to include at least one of the RAM 33 and the NVRAM 34. In a case that an external memory device such as a USB memory is connected to the printer 100, a memory area provided in the external memory device may be included in the memory area 110 of the printer 100. The printing data stored in the memory area 110 may be bitmap image data or image information data (for example, PDL data or PDF data) which is not yet expanded as the bitmap image data. In this embodiment, the memory area 110 is configured by the RAM 33 and the NVRAM 34.

After the new job is completely written and stored in the memory area 110 of the printer 100, the printer 100 waits for the input of the printing instruction for the new job (a standby state). That is the printer 100 does not start the printing of the new job at a stage when the printer 100 received the printing job. For example, in a case that the user operates the operation panel 40 of the printer 100 to input the instruction (printing instruction) for performing the printing of the new job which has already been stored in the memory area 110, the printer 100 performs the printing by the image forming section 10 based on the new job stored in the memory area 110.

Further, the printer 100 determines a free-space capacity to be reserved for the memory area 110 (hereinafter referred to as a reserved capacity, an example of a predetermined storage capacity of the present teaching) as follows. That is, the longer the period of time until the print expiration date of the new job elapses is, the larger the reserved capacity is. In a case that the actual free-space capacity of the memory area 110 is not more than the reserved capacity, the printer 100 saves the new job from the memory area 110 to a designated source apparatus (for example, the PC 200). That is, the printer 100 transmits the new job to the source apparatus as a printing job to be saved from the memory area 110 (hereinafter referred to as a saving job), and then the new job written in the memory area 110 is deleted from the memory area 110. That is, the new job is not stored in the memory area 110. In this embodiment, it is configured that the source apparatus from which the new job was transmitted is designated as a destination apparatus to which the new job is saved and in which the saving job is stored.

Even when the new job is saved to the PC 200, which is designated as the destination apparatus, without storing the new job in the memory area 110 of the printer 100, the user is capable of giving the instruction that at least one of the data amount and the print expiration date of the new job is changed in accordance with the content displayed on a display section 220 of the PC 200. In a case that the printer 100 accepts the change instruction from the PC 200, the printer 100 changes at least one of the data amount and the print expiration date of the new job. Accordingly, the new job can be stored in the memory area 110. Further, the content which is same as or equivalent to that displayed on the display section 220 of the PC 200 may be displayed on the operation panel 40.

Further, the printer 100 controls the print expiration date of the printing job stored in the memory area 110 and transmits the printing job, the print expiration date of which has elapsed, to the designated destination apparatus. Then, the printer 100 deletes the printing job, the print expiration date of which has elapsed, from the memory area 110. By doing so, a situation in which the memory area 110 is occupied for the long period of time by the printing job, the print expiration date of which has elapsed, is avoided.

<Job Receiving Process>

Subsequently, an explanation will be made about the control of the printing system 900 described above. At first, an explanation will be made with reference to a flowchart of FIG. 3 about a job receiving process which is performed in a case that the printer 100 receives the new job. The job receiving process is executed by the CPU 31 in the case that the printer 100 receives the new job from the PC 200.

At first, the CPU 31 obtains job information of the received new job and the free-space capacity of the memory area 110 (S101). In particular, the job information is extracted and obtained from the received new job by the CPU 31. Further, the CPU 31 subtracts a capacity of an occupied storage area, in which the printing job has already been stored, from the sum of the maximum storage capacity of the RAM 33 and the maximum storage capacity of the NVRAM 34 to obtain the free-space capacity of the memory area 110 for storing the new job. In this embodiment, the data amount and the print expiration date of the new job correspond to the job information of the present teaching. Next, the CPU 31 executes a reserved capacity determining process (S102, an example of the determining section of the present teaching).

In the reserved capacity determining process, the reserved capacity (an example of the predetermined storage capacity of the present teaching) is determined depending on a period of time from the receipt of the new job until the print expiration date of the new job.

After the reserved capacity determining process of S102, the CPU 31 judges as to whether or not the new job can be stored in the memory area 110 (S103). In the judgment of S103, the CPU 31 judges as to whether or not the free-space capacity of the memory area 110 is larger than the reserved capacity determined in the reserved capacity determining process, in a case that the data of the new job is stored in the memory area 110.

In a case that the free-space capacity of the memory area 110 is larger than the reserved capacity determined in the reserved capacity determining process, namely in a case that the CPU 31 judges that the new job can be stored in the memory area 110 (S103: YES), the new job is stored in the memory area 110 by the CPU 31 (S104). Then, the job receiving process is completed.

On the other hand, in a case that the free-space capacity of the memory area 110 is not more than the reserved capacity determined in the reserved capacity determining process, namely in a case that the CPU 31 judges that the new job can not be stored in the memory area 110 (S103: NO), the new job is not allowed to be stored in the memory area 110 as it is and the CPU 31 executes a job change process in which the content of the new job is changed (S105).

After the job change process, the CPU 31 judges as to whether or not the change has been made to the new job (S106). In a case that the CPU 31 judges that the change has been made to the new job (S106: YES), the new job is stored in the memory area 110 by the CPU 31 (S104). Then, the job receiving process is completed.

On the other hand, in a case that the CPU 31 judges that the change has not been made to the new job (S106: NO), for example, in a case that the print expiration date of the new job is not changed, the new job can not be stored in the memory area 110. Thus, the CPU 31 transmits the new job to the designated destination apparatus (S107). Then, the CPU 31 deletes the new job written in the memory area 110 from the memory area 110 (S108), and the job receiving process is completed. That is, the new job is not stored in the memory area 110. In the case that the printer 100 receives the new job from the PC 200, the new job may be entirely written in the memory area 110 of the printer 100 or a part of the new job, for example the job information, may be written in the memory area 110. In a case that the new job is entirely written in the memory area 110, the new job is transmitted to the designated destination apparatus and the new job written in the memory area 110 is deleted from the memory area 110.

Figure 4:
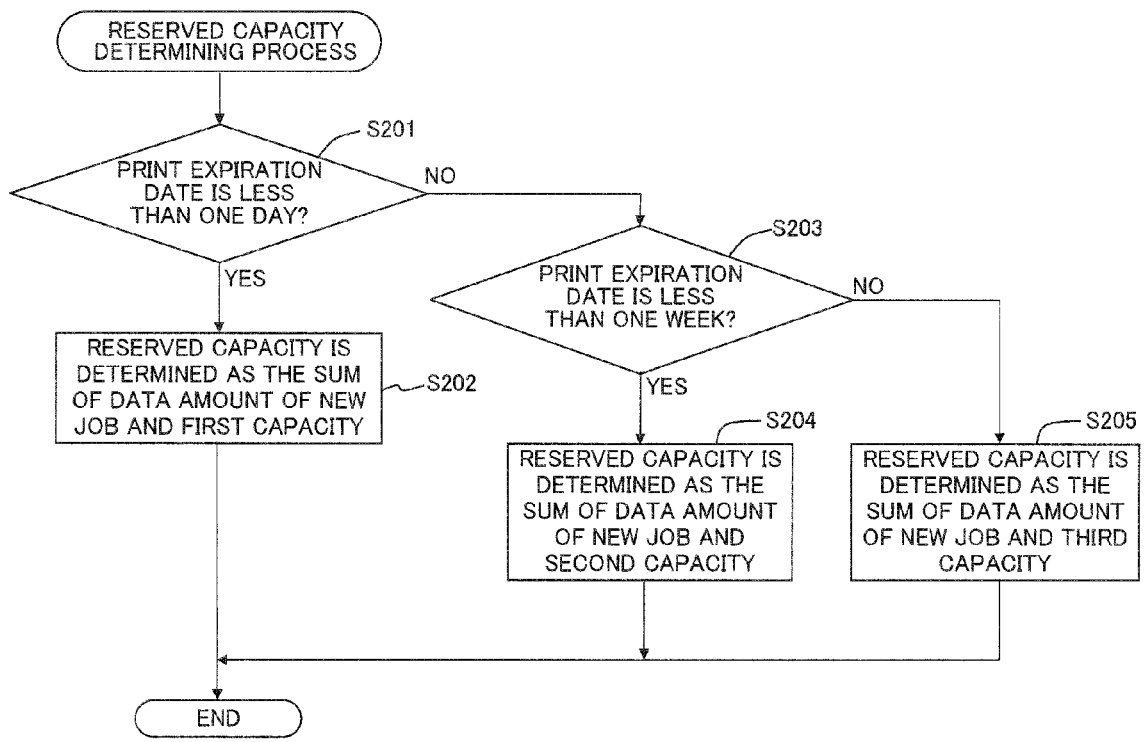
FIG. 4 is a flowchart showing a reserved capacity determining process in the job receiving process.

Next, an explanation will be made with reference to FIG. 4 about the reserved capacity determining process. There has conventionally been known the printing apparatus in which the new job is not stored in the memory area in a case that the free-space capacity of the memory area is not more than a predetermined amount. In the printing apparatus described above, many new jobs, each of which has the long period of time until the print expiration date elapses, are stored in the memory area in some cases. For example, in a case that the memory area is occupied by the job having the period of time of not less than one week until the print expiration date elapses and that the free-space capacity of the memory area is not more than the predetermined amount, the new job having the period of time of less than one day until the print expiration date elapses can not be stored in the memory area. However, since the new job having the period of time of less than one day until the print expiration date elapses is deleted from the memory area a day after, the memory area is not occupied for the longer period of time as compared with the job having the period of time of not less than one week until the print expiration date elapses. Accordingly, it is not appropriate that the job having the short period of time until the print expiration date elapses and the job having the long period of time until the print expiration date elapses are treated in the same manner (uniformly), and that the new job is not stored in the memory area because the free-space capacity of the memory area is not more than the predetermined amount.

In this embodiment, in a case that the printer 100 receives a first new job (first printing job) having first term of validity and second new job (second printing job) having second term of validity which is longer than the first term of validity, the CPU 31 determines the reserved capacity for the second new job to be larger than the reserved capacity for the first printing job. Namely, the longer the period of time until the print expiration date of the new job elapses is, the larger the reserved capacity to be reserved at the time of storing the new job in the memory area is. Thus, for example, a reserved capacity C1 of the job having the period of time of not less than one week until the print expiration date elapses is larger than a reserved capacity C2 of the job having the period of time of less than one day until the print expiration date elapses. That is, in order to store the job having the period of time of not less than one week until the print expiration date elapses, it is necessary to reserve the reserved capacity C1 which is larger than the reserved capacity C2 to be reserved at the time of storing the job having the period of time of less than one day until the print expiration date elapses. As described above, the job having the period of time of not less than one week until the print expiration date elapses is less likely to be stored in the memory area 110 as compared with the job having the period of time of less than one day until the print expiration date elapses. Accordingly, it is possible to prevent the new job, which has the long period of time until the print expiration date elapses, from occupying the memory area 110 for the long period of time.

At first, in the reserved capacity determining process, the CPU 31 judges as to whether or not the period of time until the print expiration date of the new job elapses is less than one day (S201). In a case that the period of time until the print expiration date of the new job elapses is less than one day (S201: YES), the reserved capacity is determined, by the CPU 31, as the sum of the data amount of the new job and a predetermined first capacity (S202). Then, the reserved capacity determining process is completed.

On the other hand, in a case that the period of time until the print expiration date of the new job elapses is not less than one day (S201: NO), the CPU 31 judges as to whether or not the period of time until the print expiration date of the new job elapses is less than one week (S203). In a case that the period of time until the print expiration date of the new job elapses is less than one week (S203: YES), the reserved capacity is determined, by the CPU 31, as the sum of the data amount of the new job and the second capacity, which is larger than the first capacity (S204). Then, the reserved capacity determining process is completed.

In a case that the period of time until the print expiration date of the new job elapses is not less than one week (S203: NO), the reserved capacity is determined, by the CPU 31, as the sum of the data amount of the new job and the third capacity, which is larger than the second capacity (S205). Then, the reserved capacity determining process is completed.

In the reserved capacity determining process, the capacity is larger in an ascending order of the first capacity, the second capacity, and the third capacity. The period of time, which is compared with the period of time until the print expiration date of the new job elapses, is not limited to one day or one week, but may be one month or one year. Alternatively, it is allowable to set the period of time by the user.

Figure 5:
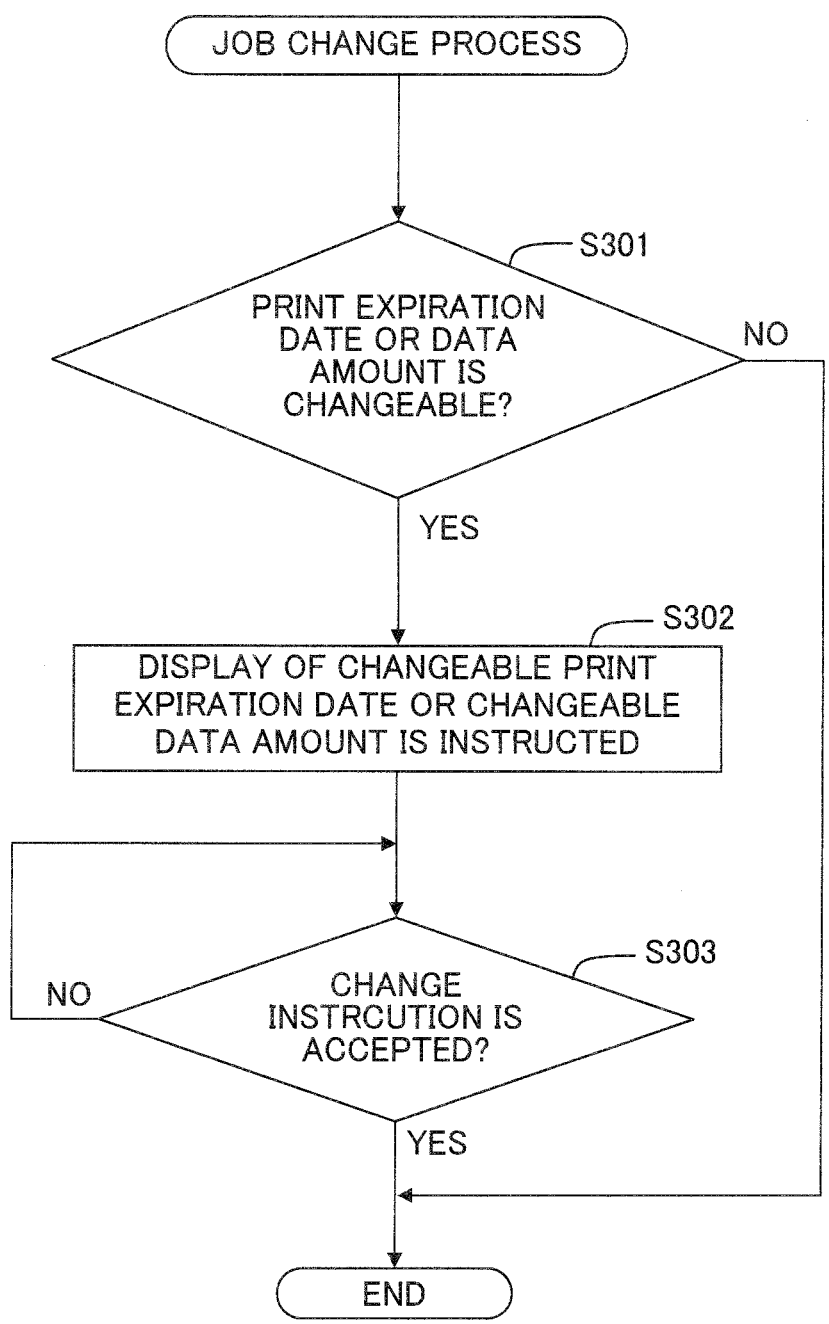
FIG. 5 is a flowchart showing a job change process in the job receiving process.

Next, an explanation will be made with reference to FIG. 5 about the job change process. In the job change process, the CPU 31 judges as to whether or not at least one of the data amount and the print expiration date of the new job is changeable (S301). In a case that the CPU 31 judges that neither the data amount nor the print expiration date of the new job is changeable (S301: NO), for example, in a case that there is no changeable print expiration date to which the print expiration date of the new job can be changed and that the data amount of the new job can not be changed, the job change process is completed by the CPU 31.

On the other hand, in a case that the CPU 31 judges that the print expiration date of the new job is changeable (S301: YES), the CPU 31 creates an expiration date display instruction (an example of expiration date information) for displaying the changeable print expiration date of the new job on the display section 220 of the PC 200, and transmits the expiration date display instruction to the PC 200 via the network interface 37 (S302). The CPU 31, which executes 5302 to create the expiration date display instruction, is an example of an expiration date information creating section.

Figure 6:
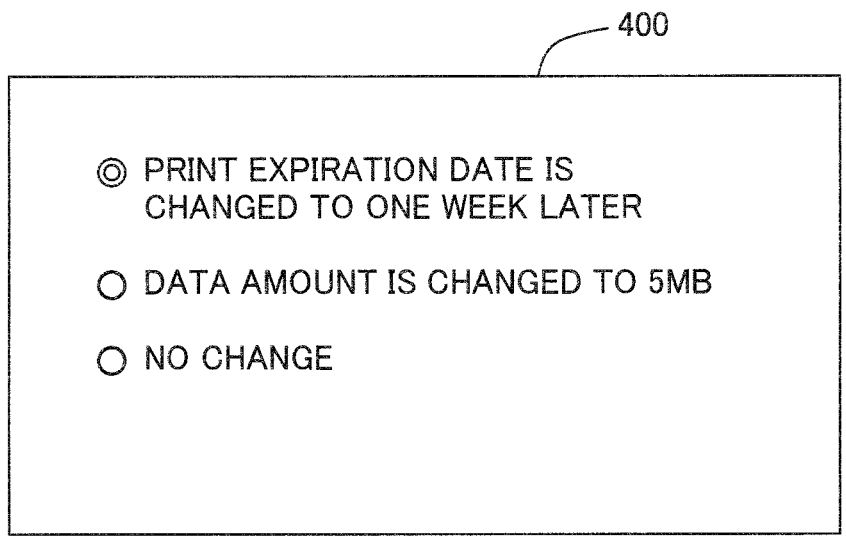
FIG. 6 is a diagram showing an example of a display which s displayed in the job change process.

For example, it is assumed that, in a case that the print expiration date of the new job is two weeks later and that said print expiration date is changed to a week later, the new job can be stored in the memory area 110. In this situation, like an option 400 as shown in FIG. 6, "one week later" is displayed on the display section 220 of the PC 200 as the changeable print expiration date.

Further, in a case that the CPU 31 judges that the data amount of the new job is changeable (S301: YES), the CPU 31 creates a data amount display instruction (an example of data amount information) for displaying a changeable data amount of the new job on the display section 220 of the PC 200, and transmits the data amount display instruction to the PC 200 via the network interface 37 (S302). The CPU 31, which executes S302 to create the data amount display instruction, is an example of a data amount information creating section.

For example, it is assumed that, in a case that the data amount of the new job is 10 MB and that said data amount is changed to 5 MB, the new job can be stored in the memory area 110. In this situation, like the option 400 as shown in FIG. 6, "5 MB" is displayed on the display section 220 of the PC 200 as the changeable data amount.

Next, in a case that the change instruction is inputted by the user through the operation section of the PC 200, the CPU 31 accepts the change instruction from the PC 200 via the network interface 37 (S303). Then, the job change process is completed. In particular, in a case that the user inputs, through the operation section of the PC 200, that the print expiration date of the new job is changed to one of the changeable print expiration dates displayed on the operation section of the PC 200, the CPU 31 accepts the expiration date change instruction (an example of the expiration date change instruction) from the PC 200. Then, the print expiration date of the new job is changed and is stored in the memory area 110. Further, in a case that the user inputs, through the operation section of the PC 200, that the data amount of the new job is changed to one of the changeable data amounts displayed on the operation section of the PC 200, the CPU 31 accepts the data amount change instruction (an example of the data amount change instruction) from the PC 200. The CPU 31 performs a data amount change process, such as compression of the data, conversion of the data into a PDF file etc., in accordance with the data amount change instruction, and stores the new job in the memory area 110. It is noted that the user may input, through the operation section of the PC 200, that the new job is not changed. The CPU 31, which executes S303 to accept the expiration date change instruction, is an example of the first instruction accepting section. The CPU 31, which executes S303 to accept the data amount change instruction, is an example of the second instruction accepting section.

Effect of the First Embodiment

In the first embodiment, the CPU 31 executes the reserved capacity determining process. Accordingly, it is prevent the printing job, which has the long period of time until the print expiration date elapses, from occupying the storage section for the long period of time.

Further, the CPU 31 creates the expiration date display instruction to display, on the display section 220 of the PC 200, the changeable print expiration date of the new job (S302). For example, "a week later" is displayed on the display section 220 of the PC 200 as the changeable print expiration date. With this display, the user is capable of knowing another changeable print expiration date, and if the user change the print expiration date to the another changeable print expiration date, the free-space capacity or the memory area 110 becomes larger than the reserved capacity. By giving the instruction to change the print expiration date through the PC 200, it is possible to improve the possibility that the printing job is stored in the memory area 110.

Further, the CPU 31 creates the data amount display instruction to display, on the display section 220 of the PC 200, the changeable data amount of the new job (S302). For example, "5 MB" is displayed on the display section 220 of the PC 200 as the changeable data amount. With this display, the user is capable of knowing another changeable data amount, and if the user change the data amount of the new job to the another changeable data amount, the free-space capacity of the memory area 110 becomes larger than the reserved capacity. By giving the instruction to change the data amount through the PC 200, it is possible to improve the possibility that the printing job is stored in the memory area 110.

Further, the printer 100 controls the print expiration date of the printing job stored in the memory area 110 and transmits the printing job, the print expiration date of which has elapsed, to the designated destination apparatus. Then, the printing job, the print expiration date of which has elapsed, is deleted from the memory area 110. Accordingly, it is possible to prevent, the printing job, the print expiration date of which has elapsed, from occupying the storage section.

Further, in the case that the current free-space capacity of the memory area 110 is less than the reserved capacity, the printer 100 does not store the new job in the memory area 110 and saves the new job to the designated destination apparatus (for example, PC 200). Thus, it is possible to reduce a risk that the new job which is not stored in the memory area 110 is lost. For example, after the printing job is transmitted to the printer 100 from a terminal device, such as the PC 200, a mobile phone, etc., in a case that the printing data included in the printing job is lost from the terminal device for some reason and that the printing job transmitted to the printer 100 is not stored in the memory area 110 and is deleted from the memory area 110 without being saved to the terminal device, there is generated the problem such that the printing data exists neither in the printer 100 nor in the terminal device. However, in this embodiment, the new job which is not stored in the memory area 110 is transmitted to the terminal device as the source apparatus. Therefore, it is possible to reduce the risk such that the new job which is not stored in the memory area 110 is lost.

Second Embodiment

Subsequently, the second embodiment of the present teaching will be explained. The second embodiment is different from the first embodiment in the job receiving process. Thus, the explanation will be made only about the job receiving process. In the second embodiment, in a case that the user of the new job received by the printer 100 is same as the user of the job stored in the memory area 110, the possibility that the new job can be stored in the memory area 110 is enhanced by deleting the job stored in the memory area 110, the user of which is the same as that of the new job.

<Job Receiving Process>

Figure 7:
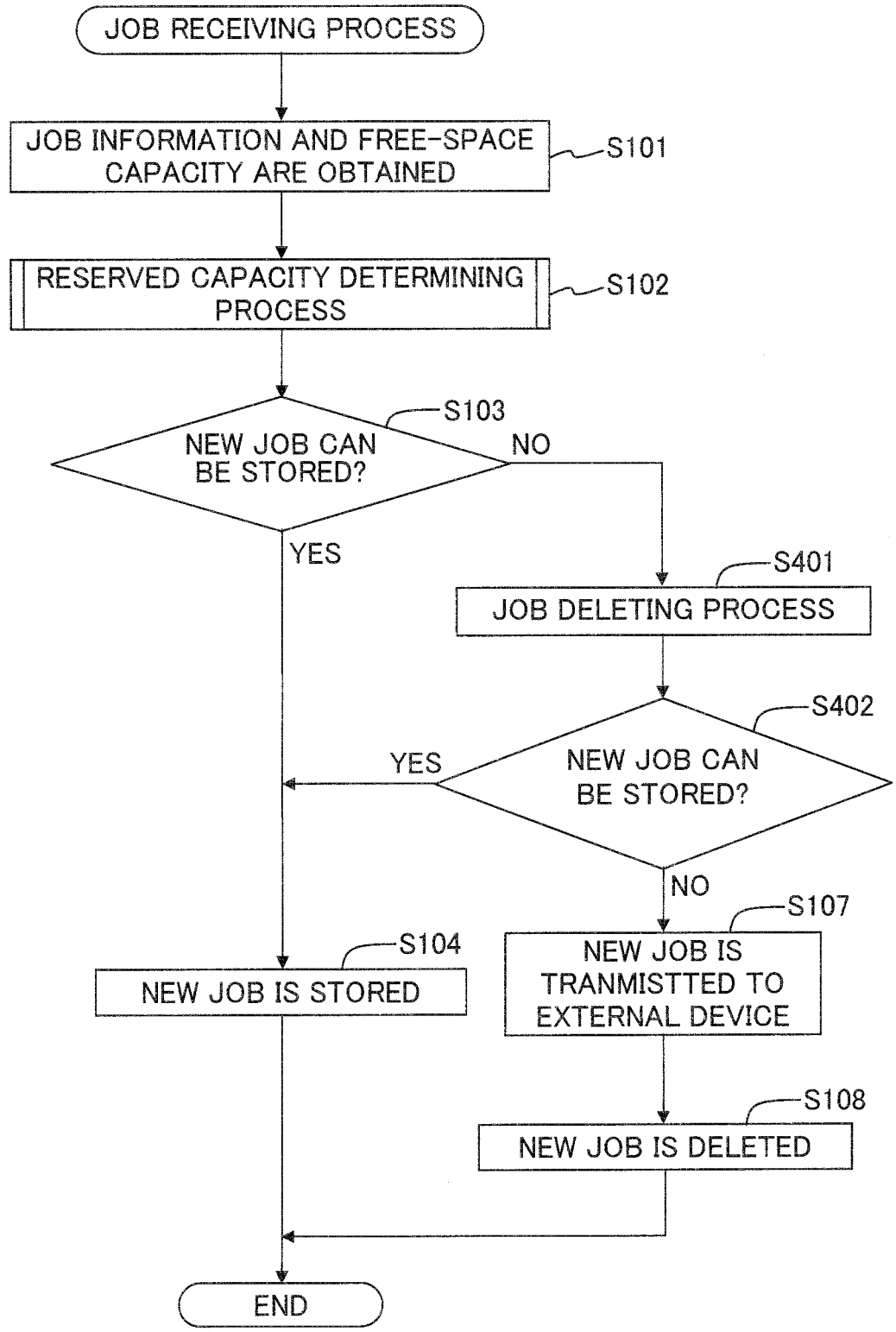
FIG. 7 is a flowchart showing a job receiving process of the printer according to the second embodiment.

An explanation will be made with reference to a flowchart of FIG. 7 about a job receiving process of the second embodiment. The processes, which are the same as or equivalent to those of the job receiving process of the first embodiment, are designated by the same reference numerals, and any explanation of which will be omitted as appropriate.

In a case that the CPU 31 judges that the new job can not be stored in the memory area 110 (S103: NO), the CPU 31 executes a job deleting process (S401) in which the job, which has already been stored in the memory area 110, is deleted, so that the new job can be stored in the memory area 110.

In the job deleting process, in the case that the job, the user of which is the same as that of the new job, (hereinafter, referred to "same-user job") is stored in the memory area 110, and in a case that the free-space capacity of the memory area 110 becomes larger than the reserved capacity determined based on the print expiration date of the new job by deleting the same-user job, the same-user job is listed on a deletion objective job list. Next, the CPU 31 creates a display instruction to display the deletion objective job list on the display section 220 of the PC 200 and transmits the display instruction to the PC 200. Then, the user operates the operation section 230 of the PC 200 to select the job to be deleted from among the deletion objective job list displayed on the display section 220 of the PC 200. The CPU 31 receives the instruction indicating the selected job from the PC 200, and deletes the selected job from the memory area 110 in accordance with the instruction. On the other hand, in a case that the same-user job is not stored in the memory area 110, the CPU 31 completes the job deleting process. Noted that, in a case that, by deleting a plurality of same-user jobs, the free-space capacity of the memory area 110 becomes larger than the reserved capacity determined based on the print expiration date of the new job, the plurality of same-user jobs may be displayed on the deletion objective job list.

After the job deleting process, the CPU 31 judges as to whether or not the new job can be stored in the memory area 110 (S402). In a case that the CPU 31 judges that the new job can be stored in the memory area 110 after deletion of the same-user job (S402: YES), the new job is stored in the memory area 110 by the CPU 31 (S104).

On the other hand, in a case that the CPU 31 judges that the new job can not be stored in the memory area 110 (S402: NO), the CPU 31 transmits the new job to the designated destination apparatus (S107), and then deletes the new job from the memory area 110 (S108). The reason thereof is as follows. That is, without the deletion of the same-user job, the free-space capacity of the memory area 110 does not become larger than the reserved capacity.

Effect of the Second Embodiment

In the second embodiment, in the case that the user of the new job received by the printer 100 is same as the user of the job (same-user job) stored in the memory area 110, the job deleting process in which the same-user job stored in the memory area 110 is deleted is executed (S401) by the CPU 31 to store the new job in the memory area 110. That is, the job to be stored in the memory area 110 is adjusted in the printing jobs possessed by the same user. Accordingly, for example, the job possessed by any other user is not deleted from the memory area 110 in order to store the new job in the memory area 110. Thus, it is possible to reduce an adverse effect on any other user.

The embodiments described above are mere examples, and are not intended to limit the present teaching in any way. Accordingly, as a matter of course, the present teaching may be improved and/or modified in other various forms without deviating from the gist or essential characteristics of the present teaching. For example, the printer may be any apparatus or device provided at least with a printing function, and the present teaching is applicable to multifunction machines and copy machines. Further, the information process apparatus through which the printing job is transmitted to the printer is not limited to the personal computer. For example, the information process apparatus may be mobile terminals such as the smartphone.

In the embodiments, the printing of the printing job stored in the printer 100 is started by the operation of the operation panel 40 of the printer 100. However, the present teaching is not limited thereto. For example, the printing may be started when the printing instruction from the mobile terminal is accepted or when authentication of a card reader etc. is made.

In the embodiments, the printing job is directly transmitted to the printer 100 from the PC 200. However, the present teaching is not limited thereto. For example, the printing job may be transmitted to the printer 100 from the PC 200 via the server 300.

In the embodiments, the saving job is transmitted to the PC 200. However, the destination is not limited to the PC 200. For example, the saving job may be transmitted to a predetermined external device which is other than the PC 200 as the source of the printing job. Alternatively, in a case that a storage device to store the saving job is incorporated in the external device such as the server 300 which controls the terminal devices such as the printer 100 and the PC 200, the saving job may be transmitted to the storage device incorporated in the external device.

In the job receiving processes of the embodiments, the job information includes the data amount and the print expiration date of the new job. However, the job information may be one of the data amount and the print expiration date of the new job.

Figure 3:
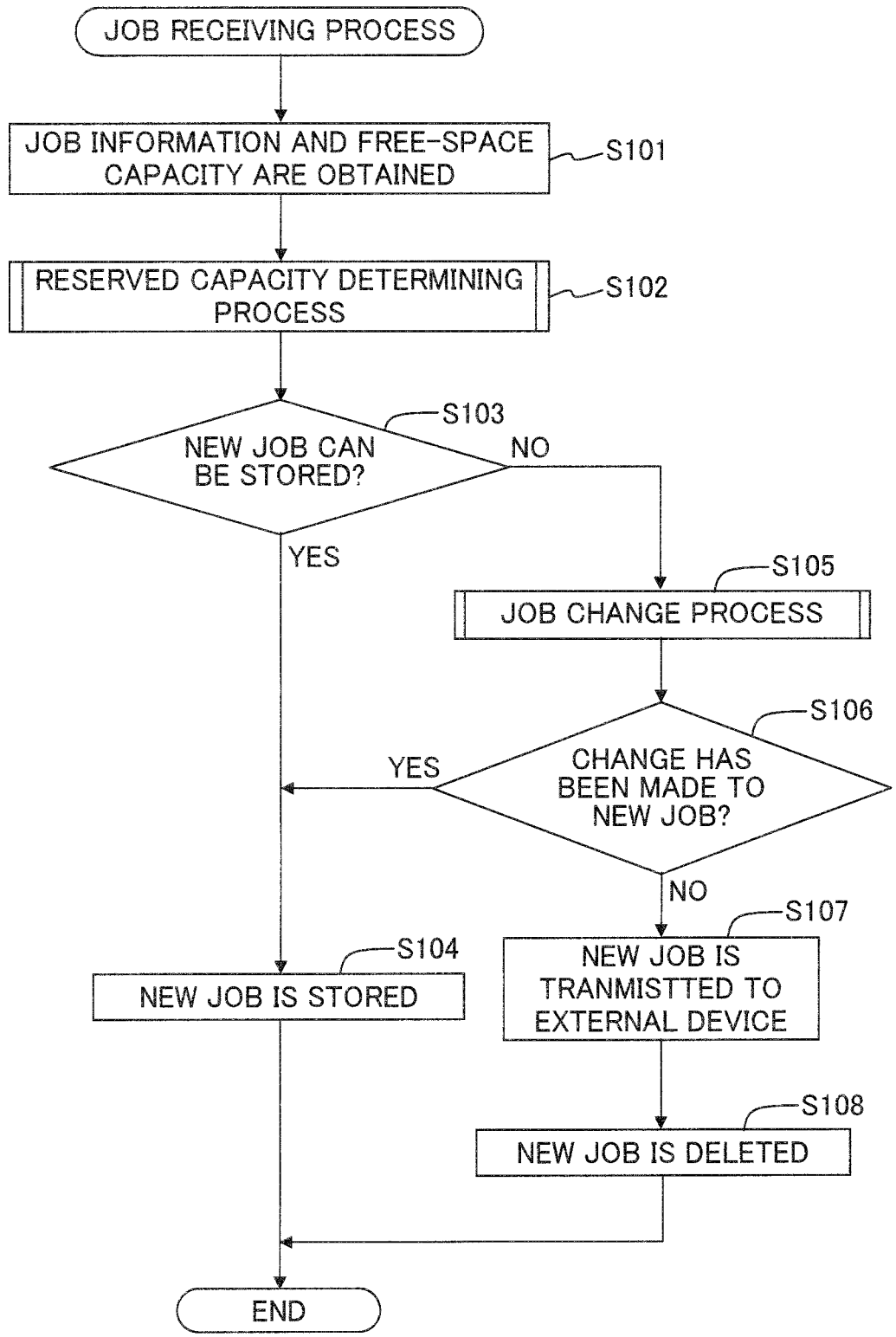
FIG. 3 is a flowchart showing a job receiving process of the printer.

In the job receiving process of the first embodiment shown in FIG. 3, S105 to S107 may be omitted. That is, the following flow is also allowable. For example, after S101 to S103 are executed in this order, in a case that the CPU 31 judges that the new job can be stored in the memory area 110 (S103: YES), the new job is stored in the memory area 110 by the CPU 31 (S104) and the job receiving process is completed. On the other hand, in a case that the CPU 31 judges that the new job can not be stored in the memory area 110 (S103: NO), the new job is deleted from the memory area 110 (S108) and the job receiving process is completed. It is noted that, the sequence or the concrete content of each process in the job receiving process may be changed as appropriate.

In the first embodiment, the CPU 31 displays "5 MB", on the display section 220 of the PC 200, as the changeable data amount of the new job. In a case that the data amount change instruction by the user is accepted, the data amount change process, such as the compression of the data, the conversion of the data into the PDF file etc., is performed. Instead of this configuration, the CPU 31 may display, on the display of the external device, that the user is prompted to select the data so that the number of pieces of data, which is transmitted to the printer from the external device such as the PC, is not more than a threshold value. For example, the file size for each data may be displayed on the display of the external device, and the user may select the data so that the number of pieces of data is not more than the threshold value.

In the first embodiment, it is configured that the changeable print expiration date and the changeable data amount are displayed on the display section 220 of the PC 200 in accordance with the expiration date display instruction and the data amount display instruction from the printer 100. Instead of this configuration, it may be configured that the changeable print expiration date and the changeable data amount may be displayed on the display section of operation panel 40 of the printer 100. In the configuration of this modified example, the user is capable of selecting the changeable print expiration date and the changeable data amount through various buttons of the operation panel 40.

What is claimed is:

1. A printing apparatus which is configured to communicate with an external device and perform printing, the apparatus comprising:
    a receiving section which is configured to receive a printing job having a term of validity and printing data from the external device;
    a storage section which is configured to store the printing job received by the receiving section;
    an input section which is configured to accept a printing instruction to perform the printing based on the printing job stored in the storage section;
    a printing section which is configured to perform the printing based on the printing job stored in the storage section in a case that the input section accepts the printing instruction; and
    a processing section which is configured to include:
        an obtaining section which is configured to obtain an information of free-space capacity of the storage section under a condition that the receiving section receives the printing job; and
        a determining section which is configured to determine a predetermined storage capacity for the printing job based on the term of validity of the printing job,
    wherein the processing section is configured to store the printing job in the storage section, in a case that the receiving section receives the printing job and that the free-space capacity of the storage section obtained by the obtaining section is larger than the predetermined storage capacity determined by the determining section, and
    the processing section is configured not to store the printing job in the storage section, in a case that the receiving section receives the printing job and that the free-space capacity of the storage section obtained by the obtaining section is not larger than the predetermined storage capacity determined by the determining section.

2. The printing apparatus according to claim 1, wherein in a case that the receiving section receives a first printing job having a first term of validity and a second printing job having a second term of validity which is longer than the first term of validity, the determining section is configured to determine the predetermined storage capacity for the second printing job to be larger than the predetermined storage capacity for the first printing job.

3. The printing apparatus according to claim 1, further comprising:
    a term of validity information creating section, which is configured to create term of validity information in relation to changeable range of the term of validity of the printing job in the case that the receiving section receives the printing job and that the free-space capacity of the storage section obtained by the obtaining section is not larger than the predetermined storage capacity determined by the determining section; and
    a first instruction accepting section which is configured to accept a term of validity change instruction to change the term of validity of the printing job to another term of validity based on the term of validity information.

4. The printing apparatus according to claim 1, further comprising:
    a data amount information creating section, which is configured to create data amount information in relation to a changeable range of the data amount of the printing data of the printing job in the case that the receiving section receives the printing job and that the free-space capacity of the storage section obtained by the obtaining section is not larger than the predetermined storage capacity determined by the determining section; and
    a second instruction accepting section which is configured to accept a data amount change instruction to change the data amount of the printing data of the printing job to another data amount based on the data amount information.

5. The printing apparatus according to claim 1,
wherein the printing job further includes user identification information; and
in a case that the receiving section receives the printing job, that the free-space capacity of the storage section obtained by the obtaining section is not larger than the predetermined storage capacity determined by the determining section, and that another printing job, which includes the user identification information which is the same as the user identification information included in the printing job, is stored in the storage section, the processing section is configured to delete the another printing job from the storage section and then store the printing job in the storage section.

6. The printing apparatus according to claim 1, wherein the processing section is configured to delete the printing job from the storage section in a case that the term of validity of the printing job stored in the storage section has elapsed.

7. The printing apparatus according to claim 1, wherein the processing section is configured to transmit the printing job which is not stored in the storage section to the external device.

8. A printing apparatus which is configured to communicate with an external device and print an image on a sheet, the apparatus comprising:
- an image forming section which is configured to print the image on the sheet;
- an interface section which is configured to communicate with the external device;
- a storage section which is configured to store a printing job having a term of validity and printing data;
- an input section which is configured to accept a printing instruction to print the image on the sheet based on the printing job stored in the storage section; and
- a controller which is configured to:
  - receive the printing job from the external device via the interface section;
  - control the image forming section to print the image on the sheet based on the printing job stored in the storage section under a condition that the controller accept the printing instruction via the input section;
wherein under a condition that the controller receives the printing job from the external device via the interface section, the controller is configured to:
  - obtain an information of free-space capacity of the storage section;
  - determine a predetermined storage capacity for the printing job, by adding a first value to a size of the printing job in a case that a length of the term of validity of the printing job is shorter than a predetermined length, and by adding a second value, which is larger than the first value, to the size of the printing job in a case that the length of the term of validity of the printing job is not shorter than the predetermined length;
  - store the printing job in the storage section, in a case that the free-space capacity of the storage section is larger than the predetermined storage capacity; and
  - not to store the printing job in the storage section, in a case that the free-space capacity of the storage section is not larger than the predetermined storage capacity.

* * * * *